United States Patent [19]

Stefano et al.

[11] 4,096,888
[45] Jun. 27, 1978

[54] HALOGENATED BUTYL INTERLAYER FOR REINFORCED ELASTOMERIC HOSE ARTICLES

[75] Inventors: Gene E. Stefano, Littleton; David N. Tally, Arvada, both of Colo.

[73] Assignee: The Gates Rubber Company, Denver, Colo.

[21] Appl. No.: 593,591

[22] Filed: Jul. 7, 1975

[51] Int. Cl.² .................. F16L 11/08; F16L 11/12
[52] U.S. Cl. ........................... 138/125; 138/137, 138/140, 138/141
[58] Field of Search ........... 138/125, 126, 127, 137, 138/140, 141, 177; 156/333; 152/352, 209 R, 360

[56] References Cited

U.S. PATENT DOCUMENTS

| | | | |
|---|---|---|---|
| 945,686 | 1/1910 | Bonner | 138/127 |
| 2,564,602 | 8/1951 | Hurst | 138/127 X |
| 2,800,145 | 7/1957 | Peierls e al | 138/137 X |
| 2,891,595 | 6/1959 | Kuntz e al | 138/127 X |
| 2,968,588 | 1/1961 | Baldwin et al | 156/333 X |
| 2,988,130 | 6/1961 | Rittenhouse | 138/126 X |
| 3,053,712 | 9/1962 | Grabowski | 156/333 |
| 3,054,428 | 9/1962 | Crawford | 138 141 |
| 3,059,682 | 10/1962 | Fischer et al. | 156/333 X |
| 3,076,737 | 2/1963 | Roberts | 138/122 X |
| 3,106,950 | 10/1963 | Ernst et al. | 156/333 X |
| 3,117,100 | 1/1964 | Cox et al. | 156/333 X |
| 3,205,914 | 9/1965 | Clark et al | 138/137 |
| 3,275,038 | 9/1966 | Roberts et al. | 138/122 |
| 3,357,456 | 12/1967 | Grawey et al. | 138/127 |
| 3,420,276 | 1/1969 | Skinner et al. | 138/127 |
| 3,540,486 | 11/1970 | Flounders | 138/127 X |
| 3,657,046 | 4/1972 | Furukawa et al | 156/333 X |
| 3,660,224 | 5/1972 | Cau et al. | 156/309 X |
| 3,682,202 | 8/1972 | Buhrmann et al. | 138/126 |
| 3,712,360 | 1/1973 | Torti et al. | 152/209 R X |
| 3,826,772 | 7/1974 | Gebhard et al. | 156/333 X |
| 3,858,617 | 1/1975 | Takada | 138/144 |
| 3,881,521 | 5/1975 | Johansen et al. | 138/126 |
| 3,883,384 | 5/1975 | Hopkins | 138/126 X |
| 3,932,559 | 1/1976 | Cantor et al. | 156/333 X |
| 3,944,453 | 3/1976 | Chudgar et al. | 138/132 X |
| 3,991,255 | 11/1976 | Blaskiewicz et al. | 156/333 X |

Primary Examiner—Richard E. Aegerter
Assistant Examiner—James E. Bryant, III
Attorney, Agent, or Firm—Curtis H. Castleman, Jr.; Raymond Fink; H. W. Oberg, Jr.

[57] ABSTRACT

A composite reinforced vulcanized elastomeric hose is disclosed including a tube, an outer cover, an interlayer interposed between the tube and cover, and a reinforcement embedded in the hose wall. The outer cover and inner tube are composed of dissimilar polymers not readily bondable to one another, one of which is an EPDM type, and the interlayer is composed of halogenated butyl which securely bonds the dissimilar polymers together and provides a low permeability internal fluid barrier for the hose article with protection to the embedded reinforcement.

12 Claims, 4 Drawing Figures

U.S. Patent    June 27, 1978    4,096,888
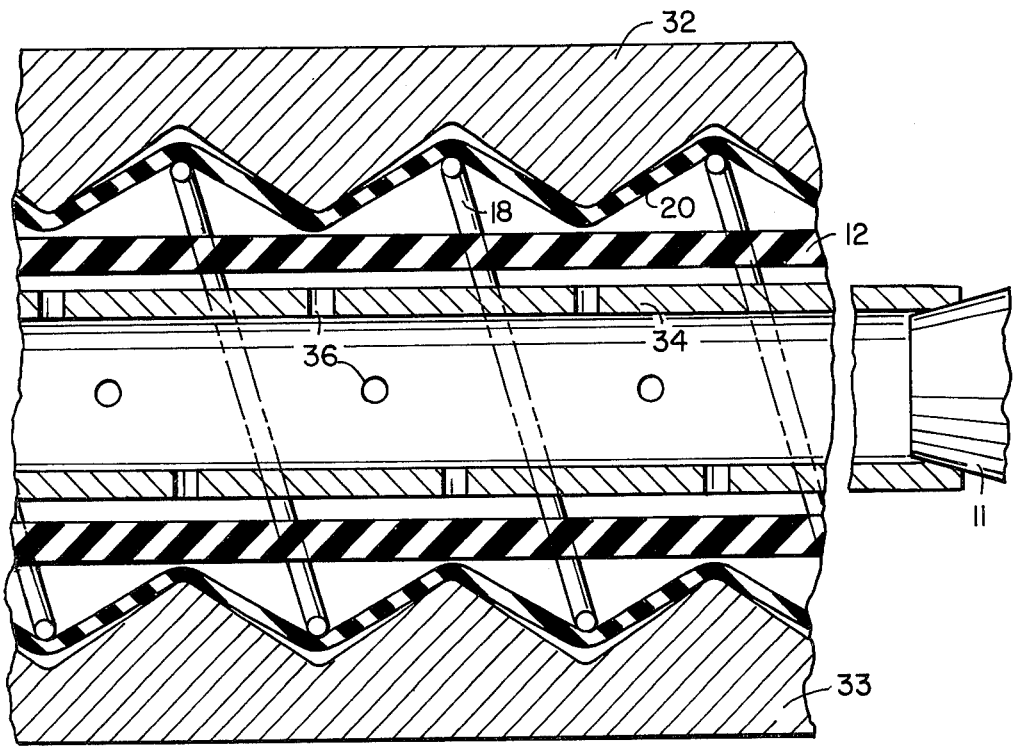
FIG. 1
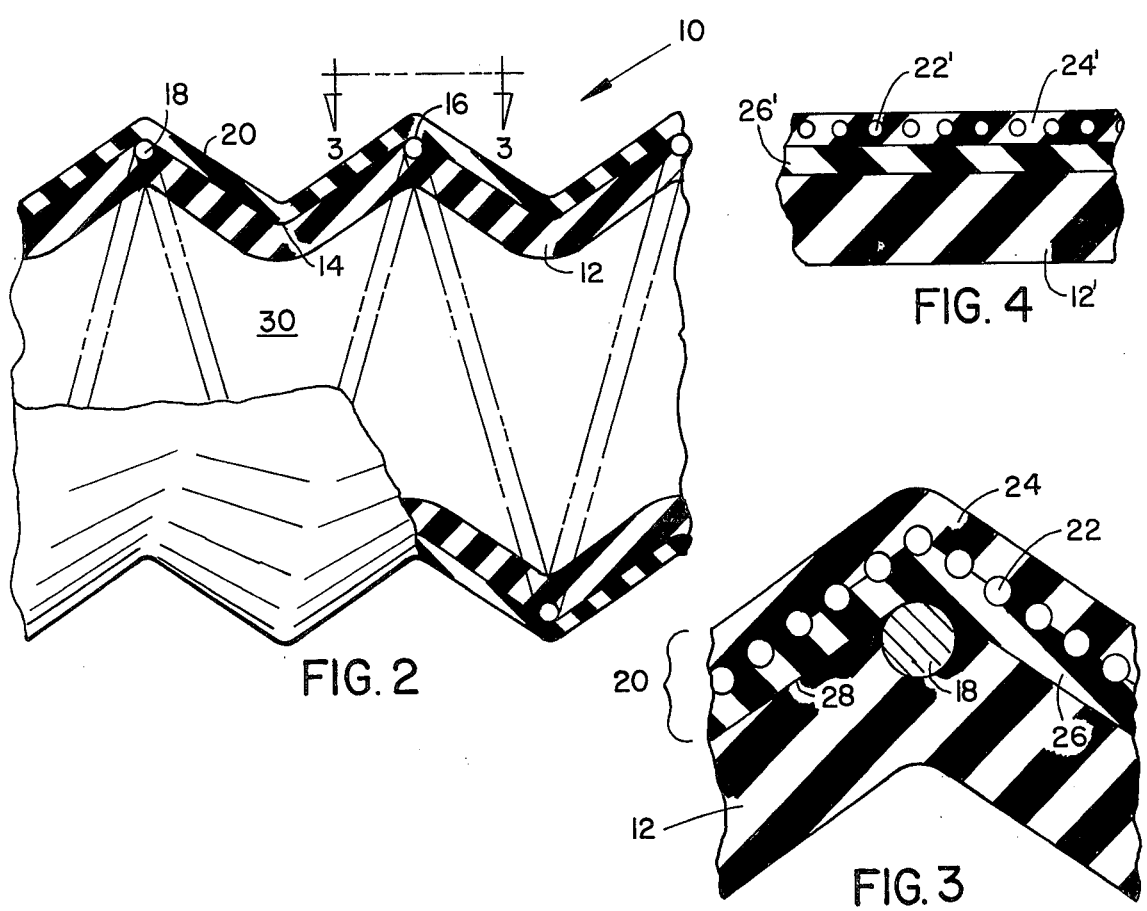
FIG. 2
FIG. 3
FIG. 4

HALOGENATED BUTYL INTERLAYER FOR REINFORCED ELASTOMERIC HOSE ARTICLES

BACKGROUND OF THE INVENTION

This invention relates to composite hose articles in which the cover and tube are made of dissimilar polymers normally not readily bondable one to the other, and to a method of making such hose.

Oftentimes the mode of failure of both high and low pressure hoses, such as automotive radiator coolant hose, is attack of the embedded reinforcement by the conveyed fluid after permeation through the inner tube layer. EPDM-type terpolymers are being used increasingly as tube stock (and cover stock) in reinforced hose structures particularly because of economic considerations as well as resistance which such terpolymers exhibit against thermal and chemical influences. Despite the fact that EPDM is less permeable to many types of conveyed fluids than more frequently used tube stocks, the problem of permeation through the tube (and eventually completely through the hose) and/or attack of the embedded textile reinforcement remains significant.

An additional problem presented by the use of EPDM-type terpolymers has been the lack of building tack and final adhesivity provided by the terpolymers particularly due to the low unsaturation content and relatively slow cure rates exhibited by the polymers. As a result, there are very few elastomeric materials which will readily bond directly with EPDM-type terpolymers to form composite articles with adequate interfacial adherence.

The most relevant prior art known to Applicants at this time include U.S. Pat. Nos. 3,059,682 to Fischer et al., 3,492,370 to Wirth, 3,651,176 to Usamoto et al., 3,660,224 to Cau et al., 3,682,202 to Buhrmann et al. and 3,712,360 to Torti et al.

It is a primary object of the subject invention to provide a composite hose article in which either the tube or cover is made of an EPDM-type terpolymer and is bonded to a dissimilar polymer to which it is not readily bondable, with the aid of an interlayer which additionally and very importantly serves as a fluid barrier internally positioned within the hose wall, also protecting the embedded textile reinforcement.

SUMMARY OF THE INVENTION

Briefly described, the composite elastomeric hose article of the invention includes (1) a first heat setting elastomeric annular member having appreciable permeability to the conveyed fluids and composed of a copolymer of mixed mono-olefins and polyolefins (e.g., EPDM terpolymers), (2) a second heat setting elastomeric annular member of a material dissimilar from the copolymer and not readily bondable therewith, one of the annular members serving as an outer cover and the other as an inner tube for the hose composite, (3) a fibrous reinforcement embedded within the hose composite wall and free from contact with the first annular member, and (4) an interlayer of a heat setting halogenated butyl elastomer interposed between and mutually bonded to each of the inner tube and outer cover, providing a low permeability fluid barrier internally within the hose composite.

In another aspect, the invention pertains to a method for making such a hose composite including the steps of: (1) forming a cylindrically shaped tube of vulcanizable elastomer comprising a copolymer of mixed mono-olefins and polyolefins blended with specified accelerators, (2) applying to one side of a textile layer reinforcement a gum layer of halogenated butyl vulcanizable elastomer, (3) positioning the textile layer about the tube with the gum layer of halogenated butyl interposed between the tube and textile layer, (4) applying a cover over the textile layer composed of an elastomeric material dissimilar from and not readily bondable to the copolymer, and (5) vulcanizing the thus formed article to produce a composite unitary hose.

The hose articles of the invention encompass various types of reinforced hoses generally of a flexible nature including, by way of illustration, automotive radiator coolant hose (which will be described with more particularity hereafter), heater hose, hydraulic hose, and the like. The invention is not limited to any specific type of hose.

BRIEF DESCRIPTION OF THE DRAWINGS

The invention will be more particularly set forth in certain illustrated embodiments by reference to the accompanying drawings, in which:

FIG. 1 is a fragmentary mold with an uncured hose article positioned therein for producing flexible radiator coolant hose;

FIG. 2 is a fragmentary partial sectional view of a hose made in the mold of FIG. 1;

FIG. 3 is an expanded cross sectional view of the wall of the hose of FIG. 2, viewed adjacent section 3—3; and FIG. 4 is a longitudinal section of the wall of a conventional hose depicting an alternative embodiment of the invention.

PREFERRED EMBODIMENTS OF THE INVENTION

An illustrative radiator coolant hose made in accordance with the invention is shown in FIGS. 2 and 3. The hose generally designated at 10 comprises a helically corrugated inner tube 12 composed of EPDM-type terpolymer, having outward helically fashioned valleys 14 and crests 16. At substantially the apex of the crests 16 are disposed convolutions of spiral reinforcement 18, preferably made of a spirally coiled spring preformed to the desired pitch and diameter.

The outer surface of the hose, which is also helically corrugated, is composed of a rubberized fabric cover 20. In accordance with the invention the cover 20 is in turn composed of a reinforcement 22 embedded within an elastomeric matrix including an outermost skim rubber layer 24 composed of a polymeric material dissimilar from EPDM-type terpolymers and not readily bondable therewith, together with an interlayer 26 interposed between the fabric reinforcement 22 and inner tube member 12. This tie gum layer 26 is directly bonded to the inner tube 12 along their mutual interface 28. In turn, the tie gum layer 26 is directly bonded to the outer cover elastomeric layer 24 through interstices provided in the fibrous reinforcement.

The tie gum layer 26 is interposed between the inner tube member 12, on the one hand, and the outer cover 24 and reinforcement 22, respectively, thereby defining a fluid barrier resistant to penetration by any fluids which may be conveyed within the hose tube interior 30, and which have permeated through the tube member 12. In the embodiment of FIGS. 2 and 3 the tie gum layer is also directly in adherence to the fibrous reinforcement. In the alternative shown in FIG. 4 the reinforcement 22' is embedded in the cover elastomer 24' and spaced from both the inner tube layer 12' and interposed tie gum layer 26'.

A general method of making the above described hose, aside from certain compounding and curing considerations to be described hereafter, will be described generally in conjunction with FIG. 1 illustrating a preformed, uncured hose assembly located in a mold defined by upper and lower halves 32, 33 just prior to vulcanization.

The generally cylindrically shaped tube 12 may be formed in a desired manner such as by a continuous extrusion from which desired lengths are severed. This tube may then be positioned upon mandrel 34 which has a lesser outer diameter than the inner diameter of tube 12. Onto the tube is telescoped a spring and outer rubberized fabric preform. Generally the spring 18 can be preformed essentially according to the well-known methods for forming a coiled spring member, and whereby the approximate pitch and diameter dimensions are attained during the spring forming operation. The rubberized fabric cover 20 may be formed by providing a square or bias woven fabric 22, for instance, of any desired textile fibrous material and then calendering one side of the fabric 22 with the interlayer or tie gum 26 as a friction pass, and then calendering the outer cover layer 24 onto the opposed surface of fabric 22, such a by a friction and skim pass, or solely a skim coating. The rubberized fabric 20 may then be cut to the desired dimensions and then wrapped upon the preformed spring coil 18 in such a manner as to maintain the desired pitch and diameter for conformance to the mold cavities corresponding internal corrugations.

The preformed fabric and spring assembly may then be positioned over the inner tube 12, the spring convolutions registering with the corrugations in the mold halves 32, 33, the end caps positioned in place (not shown) and the mold closed. At this point the cure cycle is commenced by introducing steam internally within the hollow mandrel 34 from inlet 11 and then through ports or passageways 36 provided in the mandrel at a temperature and pressure sufficient to blow mold the hose structure against the outer mold cavity. Simultaneously the mold cavity plate temperature has been raised by conductance from the press platens (not shown) so that uniform heat and pressure is applied both internally and externally of the hose structure. In practice, it has been found that 170 psi internal steam is satisfactory, and 350° F. external platen temperature is adequate. Heat and pressure cause the elastomeric layers 12, 26 and 24 to flow and intimately bond together by vulcanization to form the composite hose article.

In general, the inner tube 12 is composed of a heat setting elastomeric copolymer of mixed mono-olefins and polyolefins and blends thereof, although in the preferred embodiment the tube is composed of EPDM-type terpolymers. By EPDM-type terpolymers is meant elastomers prepared by inter-polymerizing a monomeric mixture containing ethylene, a higher mono-olefin containing 3-10 carbon atoms and a polyolefin which is preferably a nonconjugated diene. Conventional EPDM elastomers are formed from monomeric mixtures containing ethylene, propylene and either cyclic or acyclic nonconjugated dienes, for example ethylidene norbornene and dicyclopentadiene. The molar ratios of ethylene to propylene may vary from about 45:55 to about 75:25.

Compounding of the EPDM-type terpolymer tube or annular member requires special consideration to achieve final bonding between all layers of the laminate. While the traditional cures, fillers, softeners and age resistors among other ingredients may be employed in the batch, it has been found that a special combination of accelerators is required to provide a more uniform cure for the hose composite. In essence, it is necessary to preferentially greatly speed up the curing process of the traditionally slow curing EPDM-type terpolymer layer for otherwise the interlayer of halogenated butyl would cure too fast with respect to the EPDM layer and the interface between such layers would lack sufficient cross-linking for a good bond. It has been found that the following combination cure system of ultrarapid accelerators and curing agents based on 100 parts of EPDM hydrocarbon provides a cure gradient across the entire hose composite which is of sufficient uniformity to produce excellent mutual adhesion between the various layers: 2.25-3.75 parts tetramethylthiuramdisulfide; 1.25-3.25 parts zinc dibutylthiocarbamate; 1-2 parts tetramethylthiurammonosulfide; 1.5-2.5 parts 4,4' dithiomorpholine; and 0.4-0.8 parts sulfur. As is well know, it is also advantageous to incorporate activators with the foregoing, e.g., zinc oxide and stearic acid.

The outer cover layer is also composed of a heat setting elastomeric material but differs from the EPDM-type terpolymer layer by the fact that it is dissimilar therefrom and does not readily bond to EPDM-type terpolymers. Whereas the EPDM layer may in the preferred embodiment have an unsaturation content of only about 2-8%, the outer cover layer is generally significantly more highly unsaturated, e.g., up to about 25 percent unsaturation. Representative examples of suitable outer cover materials include natural rubber, butadiene-styrene rubbers (SBR), isoprene rubber, nitrile rubber (NBR), neoprene (chloroprene) and chlorosulfonyl polyethylenes. Excluded from this grouping is butyl rubber and EPDM itself, as these materials normally form a good bond with EPDM.

The interlayer according to the invention is preferably a distinct vulcanizable tie gum although the polymer may be applied to other forms such as a cement. The interlayer will possess a permeability to the conveyed fluid which is substantially less than the permeability to that fluid exhibited by the EPDM-type terpolymer layer (and also less than that of the cover layer). Generally the thickness of the layer need only be great enough to provide a fluid barrier interposed between the fabric and EPDM-type terpolymer layer. Thus, in the example of the radiator hose disclosed in conjunction with FIGS. 2 and 3, a calendered friction layer of about 20 mils in thickness on the EPDM side of the fabric has been found sufficient.

According to the invention, the interlayer is composed of a halogenated butyl rubber, preferably either brominated or chlorinated butyl. A significant advantage of using this type of interlayer is the fact that its curing time may normally be intermediate that of each of the inner tube and outer cover layers to which it is in contact. In this manner, a balanced cure rate may be obtained over the entire composite even though the cure time of the EPDM layer (even with the special combination of acclerators) is significantly greater than the cure time for the outermost cover layer. Thus, by fully curing or slightly over-curing the cover member, and slightly under-curing the EPDM tube layer, there will still be a strong bond along each of the interfaces between the halogenated butyl and adjacent layers. A representative formula for the interlayer is set forth as follows, with parts on a weight basis.

| Component | Parts |
| --- | --- |
| Chlorobutyl HT-1066 (contains non-staining stabilizer, 2% unsaturation and 50-60 Mooney viscosity) | 100 |
| Black N550 | 16.20 |
| Black N761 | 29.60 |
| Hard Clay | 46.30 |
| Stearic Acid | 1.50 |
| LM Polyethylene (Allied Chemical -617A, melting point less than 90° C) | 3.00 |
| Sta Tac A-100 (trademark for aliphatic hydrocarbon resin) | 8.00 |
| Amberol ST 140C (trademark for unmodified phenol formaldehyde resin) | 3.25 |
| Process Oil | 4.60 |
| Zinc Oxide | 5.00 |
| Benzothiazyl disulfide | 1.40 |
| Diphenyl guanidine | .35 |
| Sulfur (80% insoluble) | 3.36 |

The reinforcement member which is embedded within the hose article is preferably a textile layer (woven fabric 22 in the above example) which has interstices therein permitting flow through, to some degree, of the adjacent elastomeric layers for intimate bonding contact with one another. This reinforcement is normally embedded in the hose wall to provide the necessary burst resistance and it is thus important to protect such fabric or other reinforcement from deterioration by permeating fluids. The halogenated butyl interlayer provides this fluid barrier function and is generally directly bonded to the fabric, thereby isolating the reinforcement from direct contact with the inner tube. The fibrous textile reinforcement may be used in various forms, for example as a woven fabric, a knit, braid, spiral and the like, formed for instance of filaments, cords, twisted strands or staple fibers of a polymeric material. The reinforcement may be twined about the inner tube in continuous fashion using a braiding or knitting machine, for instance, or wrapped on the tube, and in the latter case is preferably rubberized according to the invention with the interlayer tie gum applied to one or both surfaces of the reinforcement.

In general, a plurality of layers of reinforcement may be included, however, in the case where multiple plies are employed, the plies should not be in direct contact with one another but should instead be separated by an insulating layer of elastomeric material, which in this case could either be additional halogenated butyl or the material forming the outer cove, or a material mutually bondable to the cover and halogenated butyl layers.

While it is preferred that the halogenated butyl be in direct contact with the fabric reinforcement layer, the interlayer may exist as a simple skim layer free from direct contact with the reinforcement (FIG. 4) so long as such interlayer is interposed between the EPDM-type terpolymer layer and the textile reinforcement layer.

In the illustrated embodiment of FIGS. 2 and 3, EPDM was employed as the inner tube layer providing resistance to ozone, thermal influences and in general various chemicals, and neoprene was employed as the outer cover particularly for the advantage of releasability from the mold surface 32 (as contrasted with butyl rubber which was found to stick to the mold). Such materials may be reversed depending on the desired application. In such reversed case, the halogenated butyl layer would as in the former case be interposed between the tube layer and reinforcement.

It will be understood that the invention is capable of a variety of modifications and variations which will become apparent to those skilled in the art upon a reading of this specification, the scope of the invention being defined by the appended claims.

What is claimed is:

1. A unitary reinforced vulcanized elastomeric hose article for conveying fluids including an inner tube and outer cover which are composed of dissimilar polymers not readily bondable to one another comprising:

an inner heat setting elastomeric tube of a given permeability to the conveyed fluids and composed of a terpolymer of mixed mono-olefins and polyolefins;

an outer heat setting elastomeric cover;

a reinforcement embedded within the hose article and telescoped over and free from contact with the inner tube; and an elastomeric tie gum layer of a heat setting halogenated butyl interposed between and mutually securely bonded to each of said inner tube and outer cover;

said tie gum layer exhibiting a substantially lower permeability to the conveying fluids than said given permeability to thereby provide an internal fluid barrier for the hose article and protection to the embedded reinforcement.

2. The hose of claim 1 wherein the tube is composed of an EPDM-type terpolymer having low unsaturation.

3. The hose of claim 2 wherein the halogenated butyl is chlorinated butyl.

4. The hose of claim 1 wherein the reinforcement consists of at least one layer of a woven fabric.

5. A composite reinforced vulcanized elastomeric hose for conveying fluids comprising:

a first heat setting elastomeric annular member of a determinable permeability to the fluid to be conveyed comprised of a copolymer of mixed mono-olefins and polyolefins;

a second heat setting elastomeric annular member of a material dissimilar from said copolymer and not readily bondable therewith and spaced from the first annular member;

a reinforcement embedded within the hose composite and free from contact with said first annular member;

an interlayer of a heat setting halogenated butyl elastomer interposed between and mutually bonded to each of said first and second annular members, said interlayer exhibiting a permeability which is less than the permeability of said first annular member to thereby erect a fluid barrier internally within the wall of the hose composite.

6. The hose of claim 5 wherein the first annular member serves as an inner tube for the hose.

7. The hose of claim 5 wherein the first annular member serves as an outer cover for the hose.

8. The hose of claim 6 wherein the second annular member serves as an outer cover for the hose, and the reinforcement is embedded in the outer cover and fully encapsulated therein so as to be spaced from said interlayer.

9. The hose of claim 6 wherein the second annular member serves as an outer cover for the hose, and the reinforcement is in mutual contact with each of said outer cover and interlayer.

10. A helically corrugated flexible reinforced vulcanized hose for conveying fluids having a spiral high modulus reinforcing member embedded in the corrugations of the hose body, comprising:

a corrugated inner tube composed of EPDM having a determinable permeability to the conveyed fluids, said spiral reinforcing member being positioned at substantially the crests of the corrugations of the inner tube; and an outer rubberized fabric embedded cover securely bonded to the inner tube, comprising:

a skim rubber layer positioned adjacent the fabric and forming the outermost surface of the hose, said skim rubber layer being dissimilar from and not readily bondable to the EPDM; and a tie gum layer composed of halogenated elastomer interposed between and mutually bonded to the EPDM inner tube and skim rubber layer and in intimate bonding contact with the fabric, the tie gum layer isolating the inner tube from contact with the fabric reinforcement;

said tie gum layer exhibiting a substantially lower permeability to the conveyed fluids than the EPDM to thereby provide an internal fluid barrier for the hose article and protection to the embedded fabric.

11. The hose of claim 1 wherein the reinforcement is a fibrous textile reinforcement layer in which the individual fibers are spaced substantially away from one another to define interstices therebetween, and wherein the textile reinforcement layer is in direct contact with and interposed respectively between said outer elastomeric cover and elastomeric tie gum layer, and wherein the elastomeric material of the cover and of the tie gum layer make interfacial bonding contact within said interstices.

12. A composite reinforced vulcanized elastomeric hose for conveying fluids comprising:

a first heat setting elastomeric annular member of a determinable permeability to the fluid to be conveyed comprised of a copolymer of mixed mono-olefins and polyolefins;

a second heat setting elastomeric annular member of a material dissimilar from said copolymer and not readily bondable therewith, and spaced from the first annular member, one of said annular members serving as an inner tube for the hose composite;

a fibrous textile reinforcement layer embedded within the hose composite and free from contact with said annular member serving as the inner tube for the hose;

an interlayer of a heat setting halogenated butyl elastomer interposed between and mutually bonded to each of said first and second annular members, said interlayer exhibiting a permeability which is less than the permeability of said first annular member to thereby erect a fluid barrier internally within the wall of the hose composite; and said fibrous textile reinforcement layer having individual fibers spaced substantially away from one another to define interstices therebetween, and wherein the textile reinforcement layer is in direct contact with and interposed respectively between said elastomeric interlayer and the elastomeric annular member which is spaced away from the annular member serving as the inner tube, and wherein the elastomeric material of the interlayer penetrates within said interstices and makes interfacial bonding contact with the elastomeric material of the annular member spaced away from the inner tube.

* * * * *